(12) United States Patent
Yamamoto (10) Patent No.: US 9,244,224 B2
(45) Date of Patent: Jan. 26, 2016

(54) OPTICAL WAVEGUIDE DEVICE (71) Applicant: SHINKO ELECTRIC INDUSTRIES CO., LTD., Nagano-shi (JP)

(72) Inventor: Kazunao Yamamoto, Nagano (JP)

(73) Assignee: SHINKO ELECTRIC INDUSTRIES, CO., LTD., Nagano-shi (JP)

( * ) Notice: Subject to any disclaimer, the term of this patent is extended or adjusted under 35 U.S.C. 154(b) by 0 days.

(21) Appl. No.: 14/670,617

(22) Filed: Mar. 27, 2015

(65) Prior Publication Data
US 2015/0285995 A1 Oct. 8, 2015

(30) Foreign Application Priority Data
Apr. 8, 2014 (JP) .................................. 2014-079380

(51) Int. Cl.
*G02B 6/12* (2006.01)
*G02B 6/26* (2006.01)
*G02B 6/122* (2006.01)

(52) U.S. Cl.
CPC *G02B 6/122* (2013.01); *G02B 6/26* (2013.01); *G02B 2006/12104* (2013.01)

(58) Field of Classification Search
USPC .......................................................... 385/14
See application file for complete search history.

(56) References Cited

U.S. PATENT DOCUMENTS

2011/0286692 A1* 11/2011 Yanagisawa ................... 385/14
2013/0236138 A1 9/2013 Yamamoto

FOREIGN PATENT DOCUMENTS

| JP | 2005-136347 A1 | 5/2005 |
| JP | 2008-111990 A1 | 5/2008 |
| JP | 2013-186310 A1 | 9/2013 |

* cited by examiner

*Primary Examiner* — Akm Enayet Ullah
(74) *Attorney, Agent, or Firm* — Kratz, Quintos & Hanson, LLP (57) ABSTRACT

An optical waveguide device includes a wiring substrate including an insulating layer and a wiring layer formed on the insulating layer, an optical waveguide formed on the insulating layer and the wiring layer, a groove portion formed on an edge side of the optical waveguide, the groove portion including an inclined face, a light path conversion mirror formed on the inclined face, and an opening portion formed in the wiring layer under the optical waveguide, wherein the wiring layer is not formed under the groove portion.

4 Claims, 13 Drawing Sheets

OPTICAL WAVEGUIDE DEVICE

CROSS-REFERENCE TO RELATED APPLICATIONS

This application is based upon and claims the benefit of priority of the prior Japanese Patent Application No. 2014-079380, filed on Apr. 8, 2014, the entire contents of which are incorporated herein by reference.

FIELD

This invention is related to an optical waveguide device and a method of manufacturing the same.

BACKGROUND

In the prior art, there is an optical waveguide device in which optical waveguides which handle light signals are formed on a wiring substrate which handles electric signals. The optical waveguide device is an optoelectronic composite substrate, in order to compensate the limit of the transmission speed of the electric signals, the high speed parts can be transmitted by the light signals.

A light path conversion mirror is arranged on an edge side of the optical waveguide, and an optical element is mounted on the wiring substrate so as to be optically coupled to the light path conversion mirror of the optical waveguide.

A related art is disclosed in Japanese Laid-open Patent Publication No. 2005-136347, Japanese Laid-open Patent Publication No. 2008-111990, and Japanese Laid-open Patent Publication No. 2013-186310.

SUMMARY

In the optical waveguide, a structure in which a core layer is surrounded by cladding layers is formed, then a groove portion is formed so as to divide the core layer, then a light reflective metal layer is formed on an inclined face of the groove portion, thus a light path conversion mirror is constituted.

When the groove portion for the light path conversion is formed, if the groove portion is formed to a wiring layer (copper) located to the lower side, the wiring layer is deformed, thus there is a problem in which the detachment is easily generated at the interface between the wiring layer and the cladding layer.

Moreover, a gas component is contained in the insulating material of the wiring substrate. Thus, the gas expands by a heat process, and interlayer detachment or the like is easily generated. For this reason, a structure capable of easily discharging the gas to the outside is preferred.

According to one aspect discussed herein, there is provided an optical waveguide device, including a wiring substrate including an insulating layer and a wiring layer formed on the insulating layer, an optical waveguide formed on the insulating layer and the wiring layer, a groove portion formed on an edge side of the optical waveguide, the groove portion including an inclined face, a light path conversion mirror formed on the inclined face, and an opening portion formed in the wiring layer under the optical waveguide, wherein the wiring layer is not formed under the groove portion.

Also, according to another aspect discussed herein, there is provided a method of manufacturing an optical waveguide device, including preparing a wiring substrate having a wiring layer, a non-formation region that the wiring layer is not formed, an optical waveguide formation region, and an opening portion formed in the wiring layer at the optical waveguide formation region, forming an optical waveguide in the optical waveguide formation region on the wiring substrate so as to cover the wiring layer, forming a groove portion in the optical waveguide in a region corresponding to the non-formation region in the wiring layer, the groove portion including an inclined face, and forming a light path conversion mirror on the inclined face of the groove portion.

The object and advantages of the invention will be realized and attained by means of the elements and combination particularly pointed out in the claims.

It is to be understood that both the foregoing general description and the following detailed description are exemplary and explanatory and are not restrictive of the invention, as claimed.

DESCRIPTION OF EMBODIMENTS

Hereinbelow, embodiments will be explained with reference to the accompanying drawings.

FIG. 1A to FIG. 9B are views depicting a method of manufacturing an optical waveguide device of an embodiment. FIG. 10 is a view depicting an optical waveguide device of the embodiment. Hereinbelow, while explaining the method of manufacturing an optical waveguide device, the structure of the optical waveguide device will be explained.

Figure 1A:
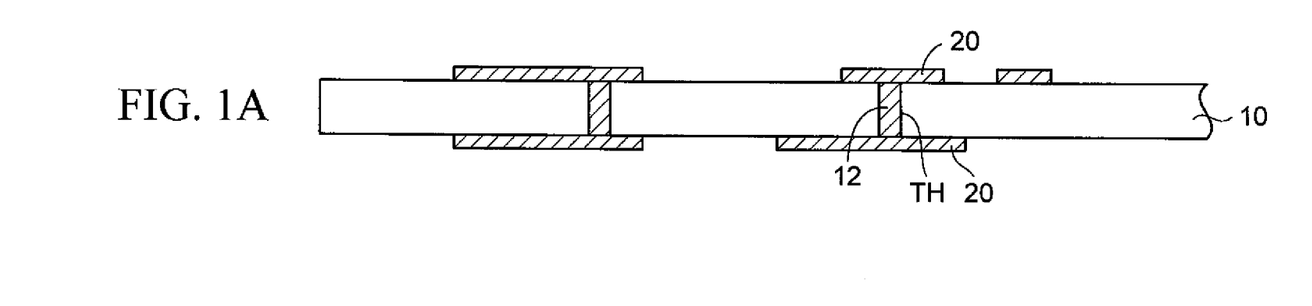
FIGS. 1A and 1B are cross-sectional views depicting a method of manufacturing an optical waveguide device of an embodiment (Part 1).

In the method of manufacturing an optical waveguide device of the embodiment, first, as depicted in FIG. 1A, a core substrate 10 in which first wiring layers 20 are formed on each of both face sides respectively is prepared. The core substrate 10 is formed of an insulating material which is a glass epoxy resin or the like, and the first wiring layers 20 are formed of a wiring material which is copper or the like.

Through-holes TH are provided in the core substrate 10, the through-holes TH penetrating in the thickness direction thereof. And penetration conductors 12 are filled in the through-holes TH. The first wiring layers 20 on both face sides are connected each other through the penetration conductors 12.

Alternatively, a through-hole plating layer may be formed on sidewalls of the through-holes TH of the core substrate 10, and a resin may be filled in the remaining hole parts. In this case, the first wiring layers 20 on both face sides are connected each other through the through-hole plating layers.

Figure 1B:
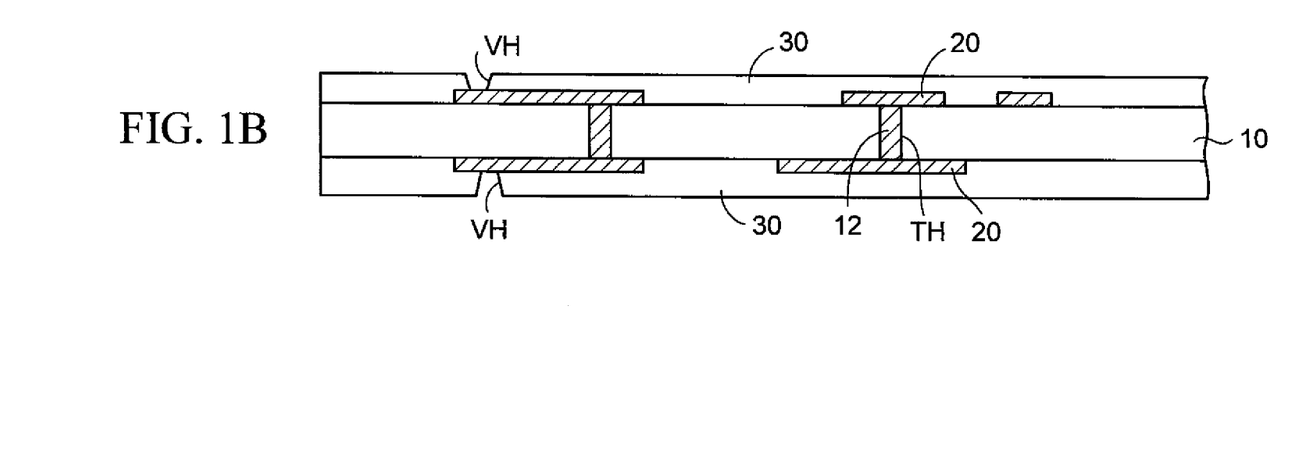

Then, as depicted in FIG. 1B, insulating layers 30 are formed on both face sides of the core substrate 10 respectively, the insulating layers 30 in which via holes VH reaching the first wiring layers 20 are provided. The insulating layer 30 is formed of an epoxy resin, a polyimide resin, or the like. The via holes VH formed in the insulating layer 30 may be formed by a laser processing or formed by patterning a photosensitive resin by the photolithography.

Figure 2A:
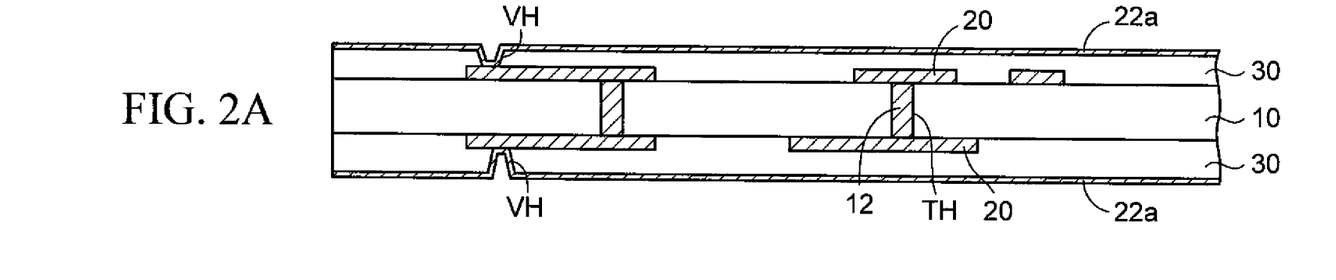
FIGS. 2A and 2B are cross-sectional views depicting the method of manufacturing an optical waveguide device of the embodiment (Part 2).

Subsequently, as depicted in FIG. 2A, on both face sides of the core substrate 10, seed layer 22a made of copper or the like is formed on the insulating layer 30 and side faces of the via holes VH by electroless plating or sputtering.

Figure 2B:
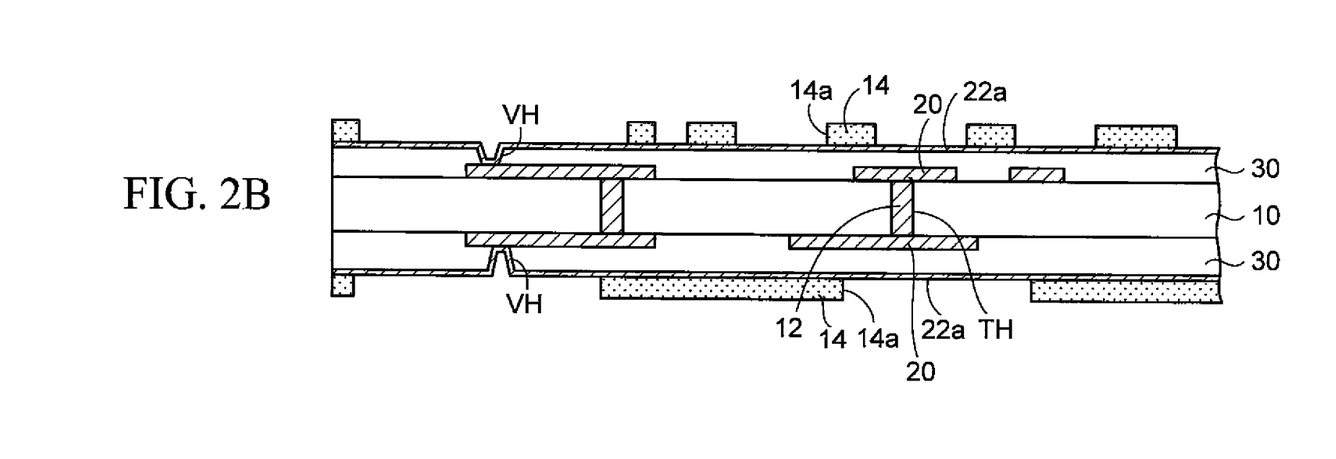

Further, as depicted in FIG. 2B, on both face sides of the core substrate 10, plating resist layer 14 is formed respectively, the plating resist layer 14 in which opening portions 14a are provided in regions where second wiring layers are to be arranged.

Figure 3A:
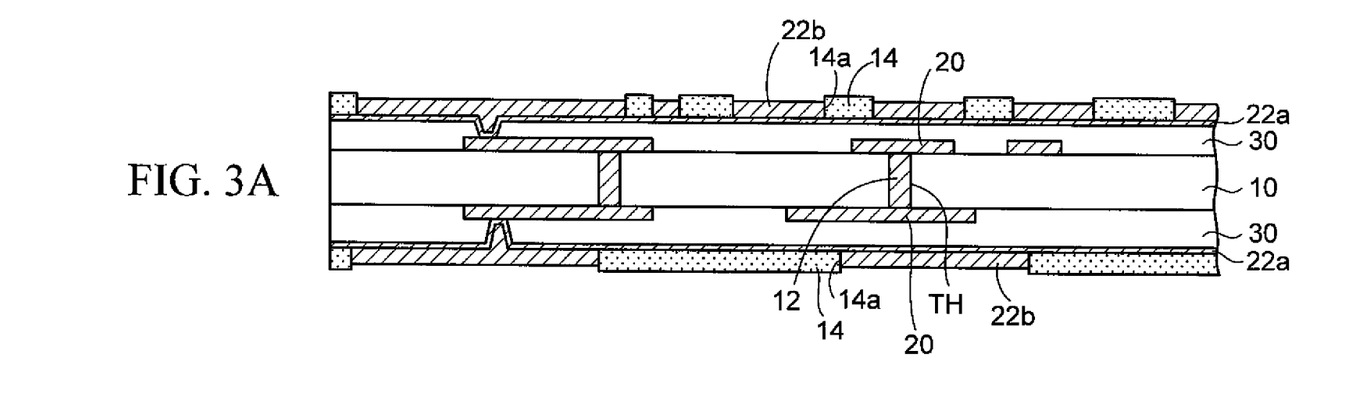
FIGS. 3A and 3B are cross-sectional views depicting the method of manufacturing an optical waveguide device of the embodiment (Part 3).
Figure 3B:
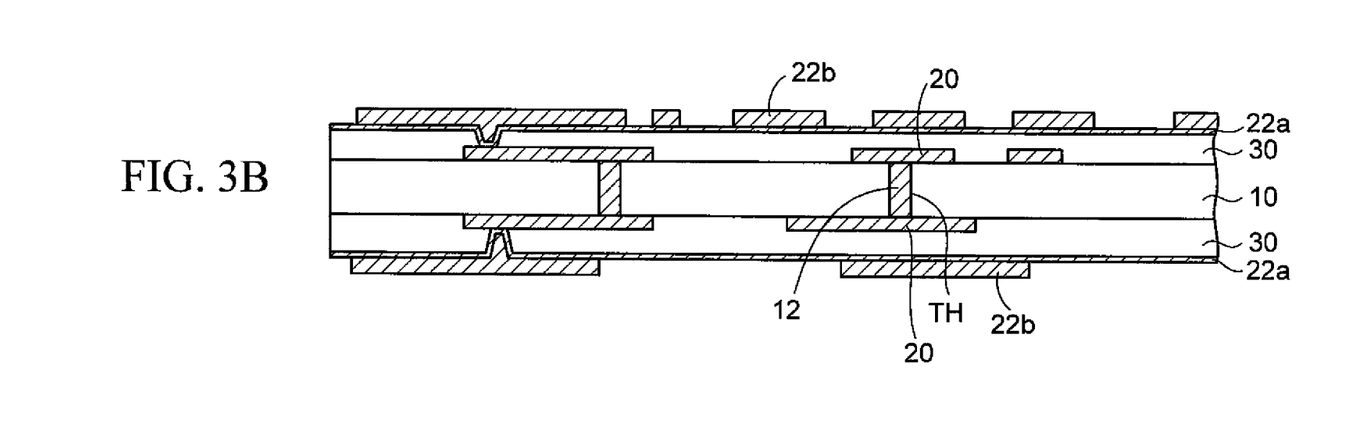

Then, as depicted in FIG. 3A, on both face sides of the core substrate 10, metal plating layers 22b made of copper or the like are formed in the region from the inside of the via holes VH to the opening portions 14a of the plating resist layers 14, by electroplating utilizing the seed layers 22a as plating power feeding paths. Thereafter, as depicted in FIG. 3B, the plating resist layers 14 are removed.

Figure 4A:
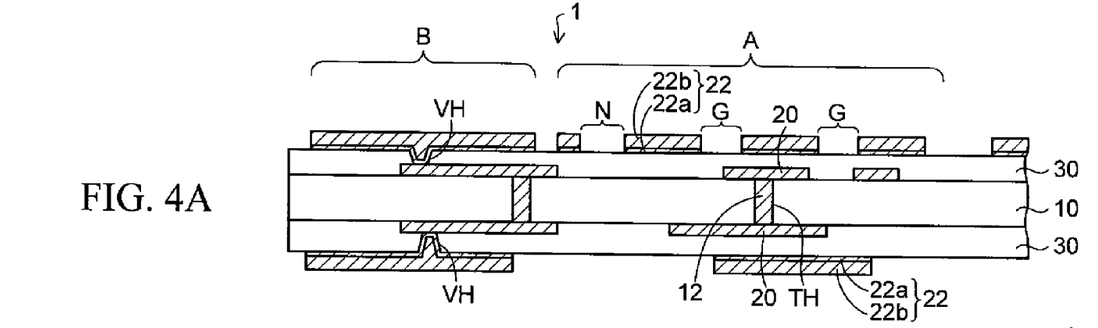
FIGS. 4A and 4B are a cross-sectional view and a plan view depicting the method of manufacturing an optical waveguide device of the embodiment (Part 4).

Subsequently, as depicted in FIG. 4A, the seed layers 22a are removed by wet etching while using the metal plating layers 22b as masks. By this matter, second wiring layers 22 are formed on the insulating layers 30 on both face sides of the core substrate 10 respectively. The second wiring layer 22 is formed by the seed layer 22a and the metal plating layer 22b.

The second wiring layers 22 on both face sides are connected to the first wiring layers 20 through via conductors in the via holes VH respectively. The thickness of the second wiring layers 22 is 10 μm to 20 μm and is set to 15 μm, for example.

An optical waveguide formation region A on which optical waveguides are to be formed and an optical element connection region B to which an optical element is to be electrically connected are defined on the upper face side of the core substrate 10.

The second wiring layer 22 arranged in the optical element connection region B is formed as a wiring which constitutes an electric circuit.

Moreover, the second wiring layer 22 arranged in the optical waveguide formation region A may be formed as a wiring which constitutes an electric circuit which is a ground plane or the like, otherwise may be formed as a floating wiring which does not constitute the electric circuit.

For example, there is a case that the second wiring layer 22 arranged in the optical waveguide formation region A is sometimes formed as a dummy pattern in order to ensure the uniformity of the thickness in the core substrate 10, when the metal plating layers 22b are formed by the electroplating method as mentioned above. In the electroplating, it is because the uniformity of the thickness in the core substrate 10 is improved when the total area of the plating patterns is large.

Moreover, there is a case that the second wiring layer 22 arranged in the optical waveguide formation region A is sometimes formed as a dummy pattern in order to ensure the flatness so that the optical waveguides do not sink to the lower side when the optical waveguides are formed.

Figure 4B:
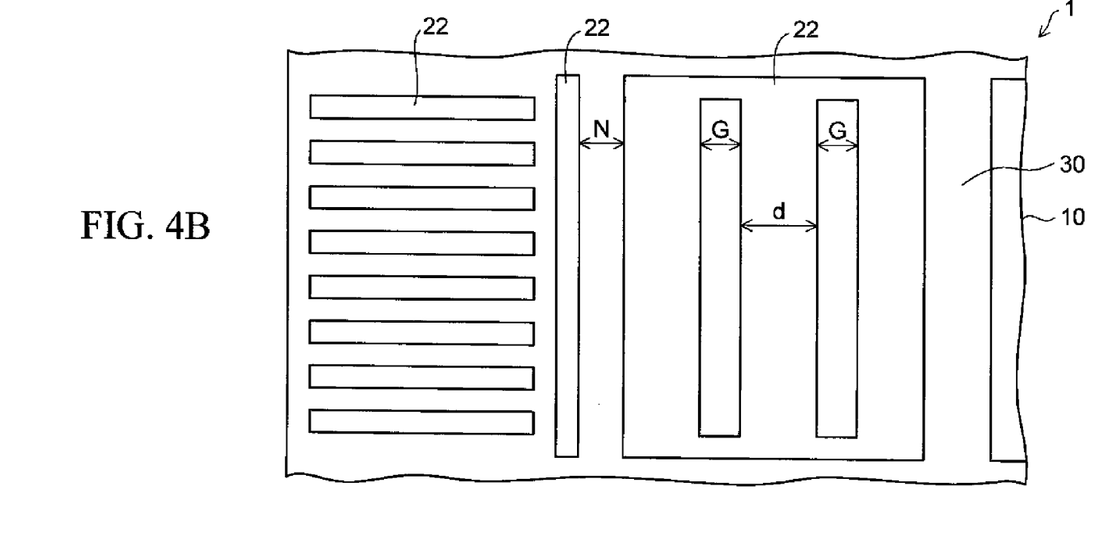

Referring to a plan view in FIG. 4B in addition to FIG. 4A, in the optical waveguide formation region A, a non-formation region N shaped like the belt that the second wiring layer 22 is not formed, is provided in one edge side that a groove portion for light path conversion is to be formed. The width of the non-forming region N in the second wiring layer 22 is set to 20 μm to 300 μm so that a level difference is not generated when the later-described optical waveguides are formed.

Moreover, in an inner region of the optical waveguide formation region A, a plurality of degassing opening portions G shaped like the belt are provided side by side in the second wiring layer 22. Similarly, the width of the degassing opening portions G is set to 20 μm to 300 μm as well so that a level difference is not generated when the later-described optical waveguides are formed.

Moreover, a distance d between the plurality of degassing opening portions G is about 1 mm to 3 mm, for example, and the arrangement number of the degassing opening portions G can be set to any suitable number according to the area of the optical waveguide formation region A.

By the above steps, a wiring substrate 1 handling the electric signals, which is used in this embodiment is manufactured. The lamination number of wiring layers on both face sides of the core substrate 10 can be set to any suitable number. It suffices that the uppermost wiring layers on the upper face side of the core substrate 10 are formed in patterns similar to those of the second wiring layers 22 mentioned above.

In this way. The wiring substrate 1 including the second wiring layer 22 in which the non-formation region N is provided in the edge side of the optical waveguide formation region A is prepared.

Figure 5:
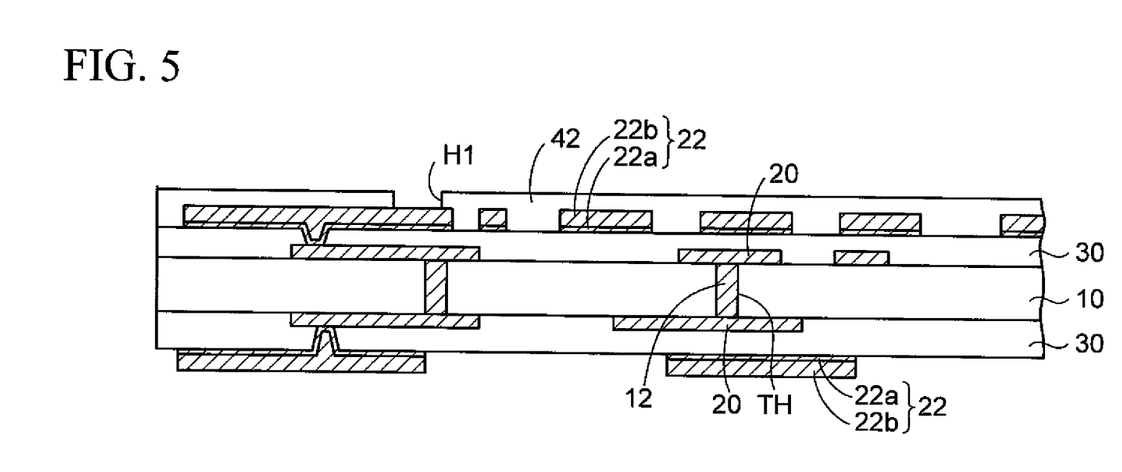
FIG. 5 is a cross-sectional view depicting the method of manufacturing an optical waveguide device of the embodiment (Part 5).

Next, a method of forming optical waveguides on the wiring substrate 1 will be explained. As depicted in FIG. 5, first, a photosensitive resin layer (not depicted) for obtaining a first cladding layer is formed on the insulating layer 30 and the second wiring layers 22 on the upper face side of the core substrate 10, and the exposure and the development are performed on the basis of the photolithography.

Thereafter, the photosensitive resin layer is cured by a heat process at about 100° C. to 140° C. to form a first cladding layer 42 in a desired region. The first cladding layer 42 is formed to include first holes H1 on connection parts of the second wiring layers 22 in the optical element connection region B. The thickness of the first cladding layer 42 is about 10 μm to 30 μm, for example. In the case that the first cladding layer 42 is formed in the whole area without patterning, a non-photosensitive resin may be used.

A UV-curable epoxy resin or the like is preferably used as the photosensitive resin layer. As a method of forming the photosensitive resin layer, a semi-cured (B-stage) photosensitive resin sheet may be attached, otherwise a liquid photosensitive resin may be coated.

Figure 6A:
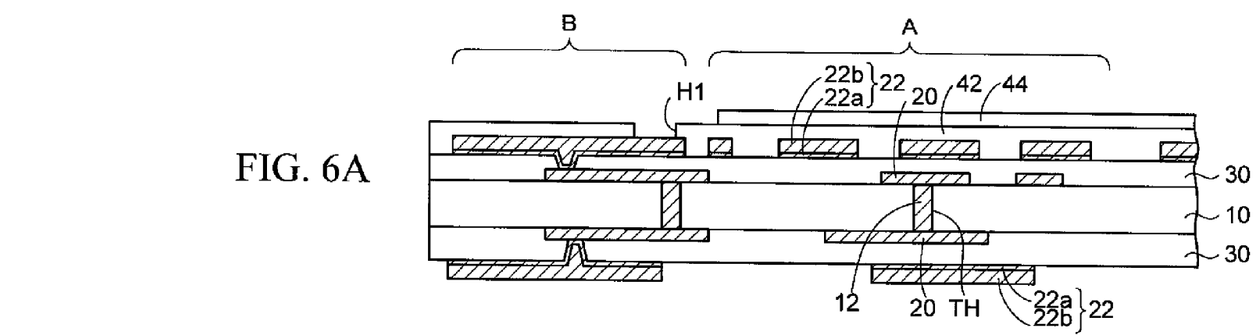
FIGS. 6A and 6B are a cross-sectional view and a plan view depicting the method of manufacturing an optical waveguide device of the embodiment (Part 6).

Subsequently, as depicted in FIG. 6A, a photosensitive resin layer (not depicted) for obtaining core layers is formed on the first cladding layer 42. Further, after the exposure and the development are performed on the basis of the photolithography, the photosensitive resin layer is cured by a heat process at about 100° C. to 140° C., thereby core layers 44 are formed on the first cladding layer 42.

Figure 6B:
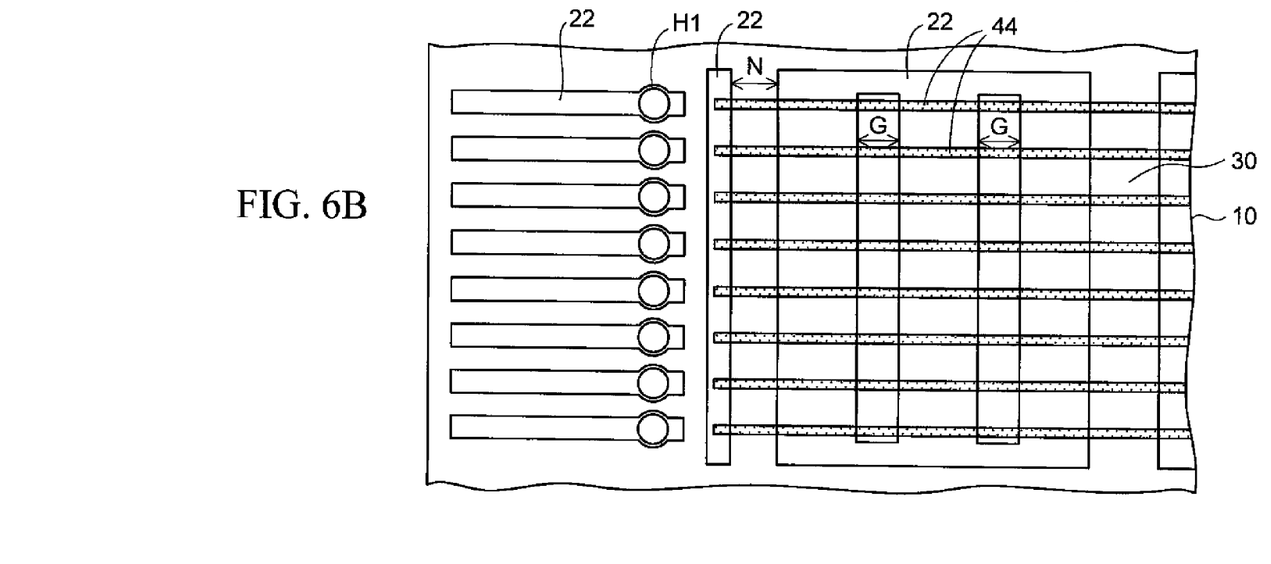

Referring additionally to a plan view in FIG. 6B, the core layers 44 are formed to extend in the direction perpendicular to the non-formation region N shaped like the belt and the degassing opening portions G shaped like the belt in the second wiring layer 22. Then, the core layers 44 are arranged so as to straddle the non-formation region N and the degassing opening portions G in the second wiring layer 22 from the one edge side to the other edge side of the optical waveguide formation region A.

In this way, the core layers 44 are formed side by side as a plurality of patterns shaped like the belt on the first cladding layer 42 in the optical waveguide formation region A.

The width of the core layers 44 is set to about 5 to 80 μm, and the thickness of the core layers 44 is set to about 5 μm to 80 μm.

Figure 7A:
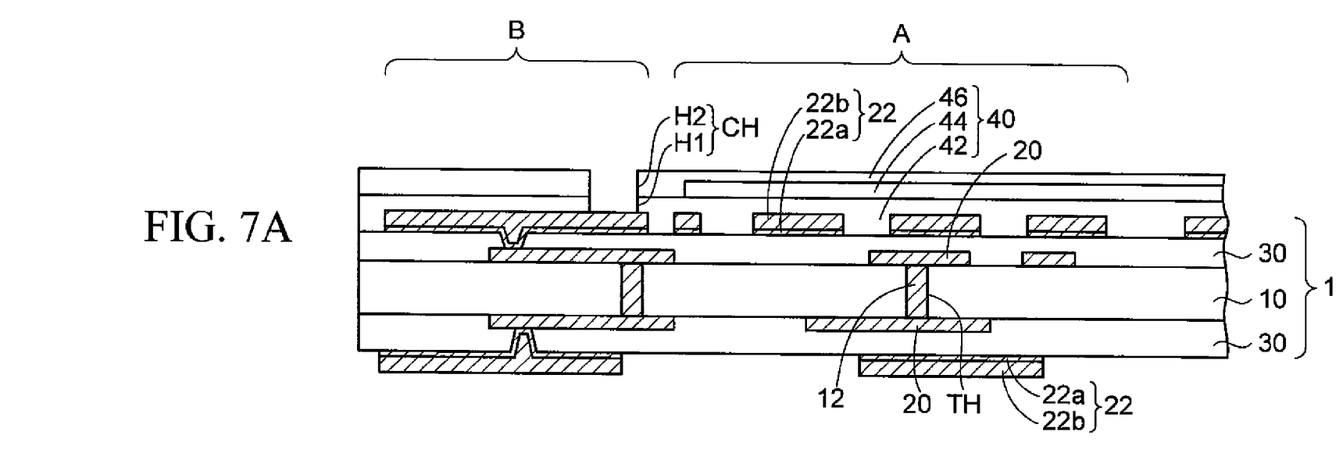
FIGS. 7A and 7B are cross-sectional views depicting the method of manufacturing an optical waveguide device of the embodiment (Part 7).

Then, as depicted in FIG. 7A, by the method similar to the method of forming the first cladding layer 42 mentioned above, a second cladding layer 46 covering the core layers 44 is formed to be patterned on the first cladding layer 42.

At this time, second holes H2 of the second cladding layer 46 are arranged on the first holes H1 of the first cladding layer 42 in a state that the second holes H2 are communicated with the first holes H1. Connection holes CH are formed by the first holes H1 and the second holes H2. The connection holes CH are arranged on the connection parts of the second wiring layers 22 in the optical element connection region B.

By this matter, optical waveguides 40 in which the core layers 44 are surrounded by the first cladding layer 42 and the second cladding layer 46 are formed. The refractive index of the core layers 44 is set higher than the refractive indexes of the first cladding layer 42 and the second cladding layer 46.

In this way, the optical waveguides 40 are formed on the insulating layer 30 and the second wiring layer 22 in the optical waveguide formation region A of the wiring substrate 1.

Note that although the connection holes CH are formed by the photolithography, the first cladding layer 42 and the second cladding layer 46 may be formed from a non-photosensitive resin and the connection holes CH may be formed by a laser.

Figure 7B:
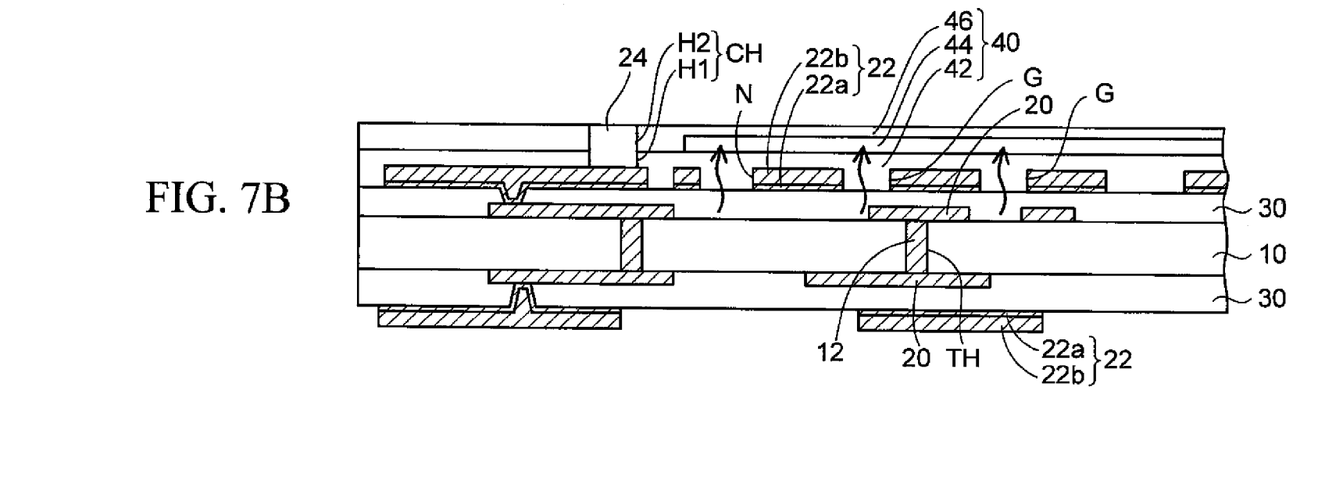

Then, solder balls are mounted in the connection holes CH of the structure in FIG. 7A, and reflow-heated at a temperature of about 260° C. By this matter, as depicted in FIG. 7B, solder electrodes 24 are buried in the connection holes CH, the solder electrodes 24 being connected to the second wiring layers 22. Solder paste may be formed in the connection holes CH by printing, instead of mounting solder balls.

In the structure in FIG. 7B, the first and second wiring layers 20 and 22 made of copper have a characteristic to block gas, on the other hand, the insulating layers 30 and the optical waveguides 40 which are formed from a resin have a characteristic to pass gas easily.

For this reason, as depicted by arrows in FIG. 7B, the gas generated from the core substrate 10 and the insulating layer 30 by the heat process is passed through the optical waveguides 40 through the degassing opening portions G of the second wiring layer 22 and is discharged to the outside. Since the first wiring layers 20 are formed with general electric wiring patterns and enough opening portions are ensured, there is no possibility that the gas is blocked by the first wiring layers 20.

Moreover, the non-formation region N in the second wiring layer 22 functions as a degassing path as well. By this matter, there is no fear that the gas generated inside the wiring substrate 1 accumulates under the second wiring layer 22 and expands. Thus, it is prevented that the interlayer detachment or the like is generated.

Figure 8A:
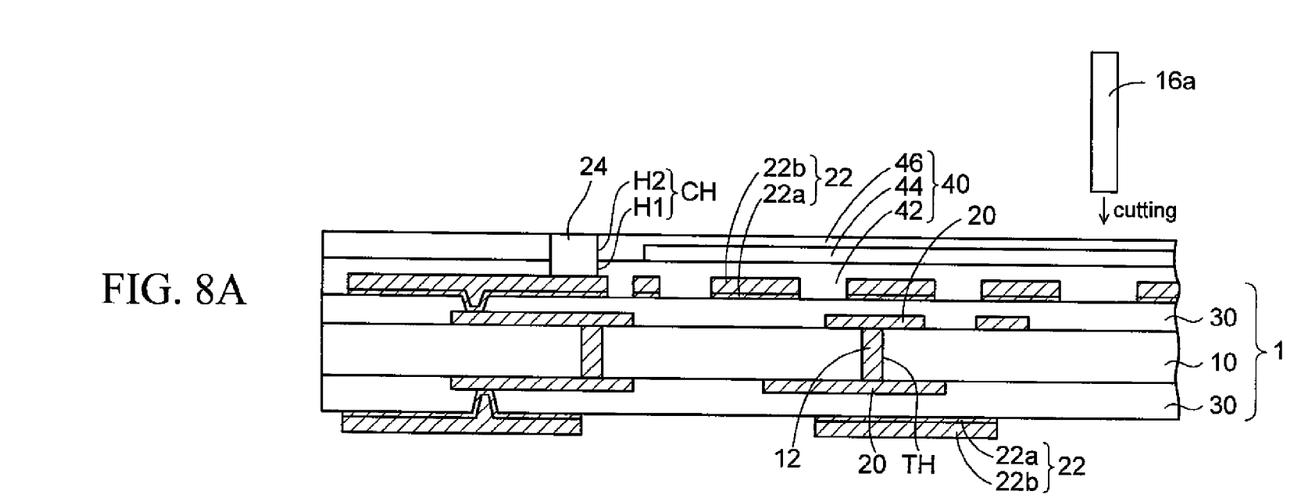
FIGS. 8A and 8B are cross-sectional views depicting the method of manufacturing an optical waveguide device of the embodiment (Part 8).
Figure 8B:
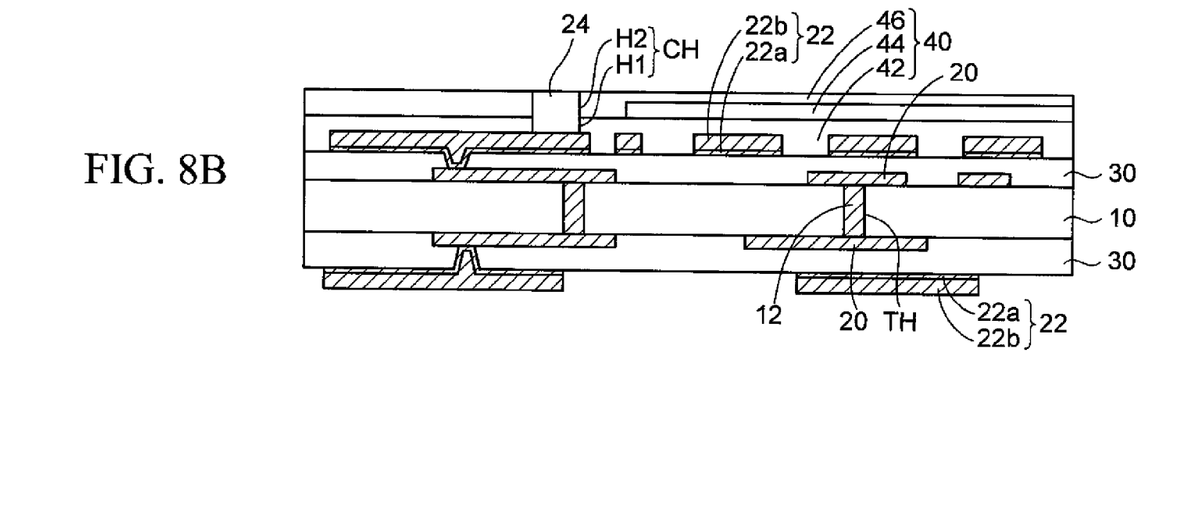

Then, as depicted in FIGS. 8A and 8B, the structure in FIG. 7B is cut from upper faces of end sides of the optical waveguides 40 to a lower face of the wiring substrate 1 by a rotary blade 16a of a cutting device.

At this time, if the first and second wiring layers 20 and 22 made of copper are exposed at the cutting face, a problem is caused in which the first and second wiring layers 20 and 22 are deformed, thus the first and second wiring layers 20 and 22 are detached from the interface between the insulating layer 30 and the first cladding layer 42.

As this countermeasure, in this embodiment, the first and second wiring layers 20 and 22 are arranged so as not to exist at the cutting part so that the first and second wiring layers 20 and 22 are not exposed at the cutting face.

By this matter, the structure in FIG. 7B is cut in a state that a side face of the first wiring layer 20 in the vicinity of the cutting face is covered with the insulating layer 30. Also, similarly, the structure in FIG. 7B is cut in a state that a side face of the second wiring layer 22 in the vicinity of the cutting face is covered with the first cladding layer 42. In this way, the reliability of the wiring layers in the vicinity of the cutting face is ensured.

Figure 9A:
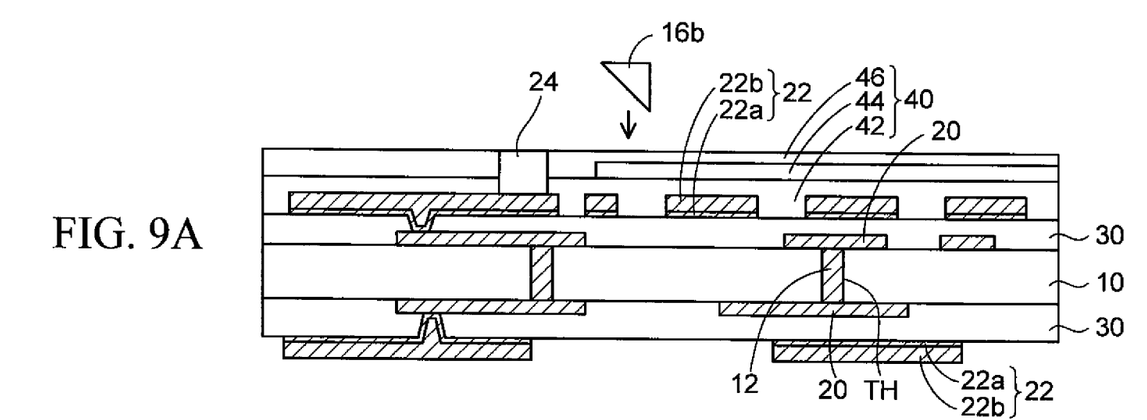
FIGS. 9A and 9B are a cross-sectional view and a plan view depicting the method of manufacturing an optical waveguide device of the embodiment (Part 9).
Figure 9B:
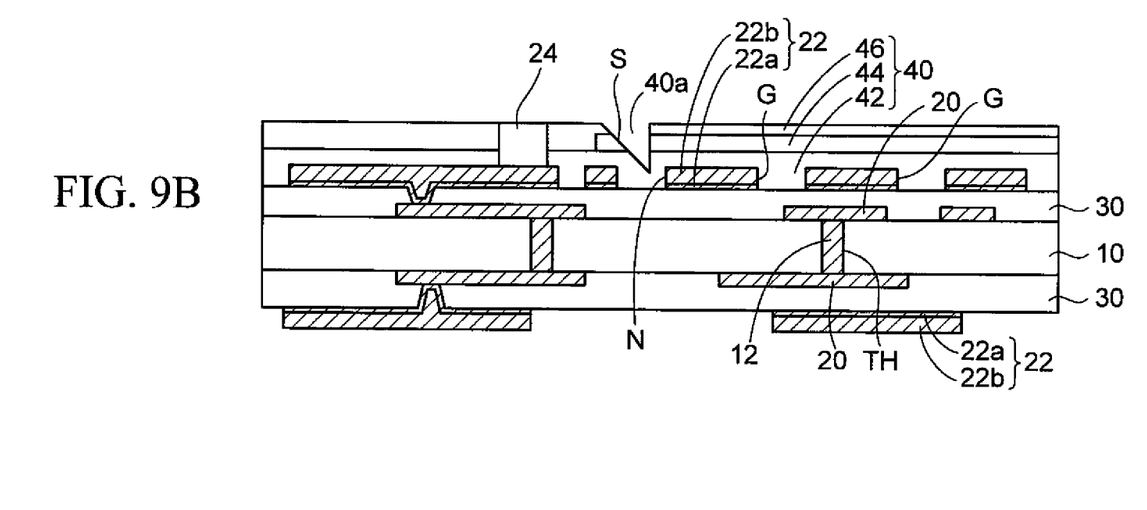
Figure 10:
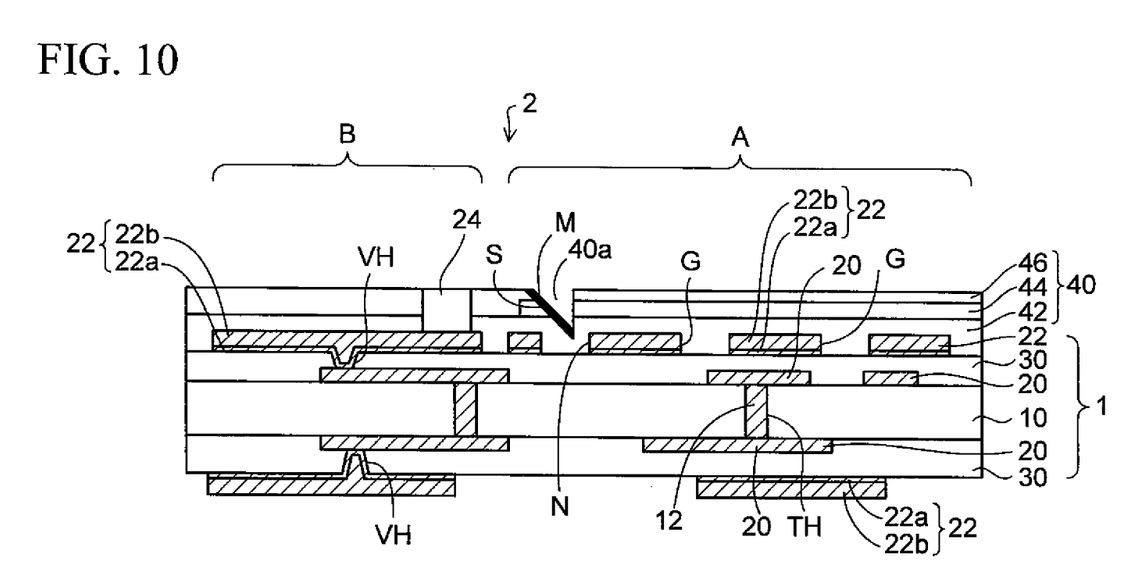
FIG. 10 is a cross-sectional view depicting an optical waveguide device of the embodiment.

Then, as depicted in FIG. 9A, the part of the optical waveguides 40 where light path conversion portions are arranged, is cut and processed so as to divide the optical waveguides 40 in the thickness direction by a rotary blade 16b of a cutting device. By this matter, as depicted in FIG. 9B, a groove portion 40a including an inclined face S is formed to one edge side of optical waveguides 40.

The groove portion 40a is formed in the optical waveguides 40 in a region corresponding to the non-formation region N in the second wiring layer 22 mentioned above. The inclined face S of the groove portion 40a is formed so as to intersect and incline with respect to the extending direction of the core layers 44 (light propagation direction) at a predetermined angle (preferably 45°).

At this time, a region under the groove portion 40a is the non-formation region N in the second wiring layer 22. Therefore, there is no possibility that the second wiring layer 22 is cut by the rotary blade 16b of the cutting device. For this reason, it is prevented that when the groove portion 40a is formed, the second wiring layer 22 is deformed and the detachment is generated at the interface with the first cladding layer 42.

Subsequently, as depicted in FIG. 10, a light reflective metal layer is formed partially on the inclined face S of the groove portion 40a by a mask vapor deposition, or the like, thus a light path conversion mirror M is obtained. Gold, aluminum, or the like is available as the light reflective metal.

Note that in the case that it is desired to enhance the degassing function from the non-formation region N in the second wiring layer 22, the width of the non-formation region N in the second wiring layer 22 is preferably set wider than the width of an opening end of the groove portion 40a. By this matter, the gas is efficiently discharged from the periphery of the light path conversion mirror M to the outside.

By the above steps, an optical waveguide device 2 of the embodiment is manufactured.

As depicted in FIG. 10, the optical waveguide device 2 of the embodiment includes the wiring substrate 1 and the optical waveguides 40 arranged thereon. The wiring substrate 1 includes the core substrate 10 in a center part in the thickness direction thereof, explained in FIG. 1A mentioned above, the core substrate 1 in which the first wiring layers 20 are formed on both face sides. The insulating layers 30 are formed on both face sides of the core substrate 10 respectively, the insulating layers 30 in which the via holes VH reaching the first wiring layers 20 are provided.

The second wiring layers 22 are formed on the insulating layers 30 on both face sides respectively and connected to the first wiring layers 20 through the via conductors in the via holes VH.

The optical waveguide formation region A and the optical element connection region B are defined on the upper face side of the core substrate 10. The optical waveguides 40 are formed on the insulating layer 30 and the second wiring layer 22 in the optical waveguide formation region A. Each optical waveguide 40 is formed by the first cladding layer 42, the core layer 44 formed thereon, and the second cladding layer 46 formed on the first cladding layer 42 and covering the core layer 44.

Figure 11:
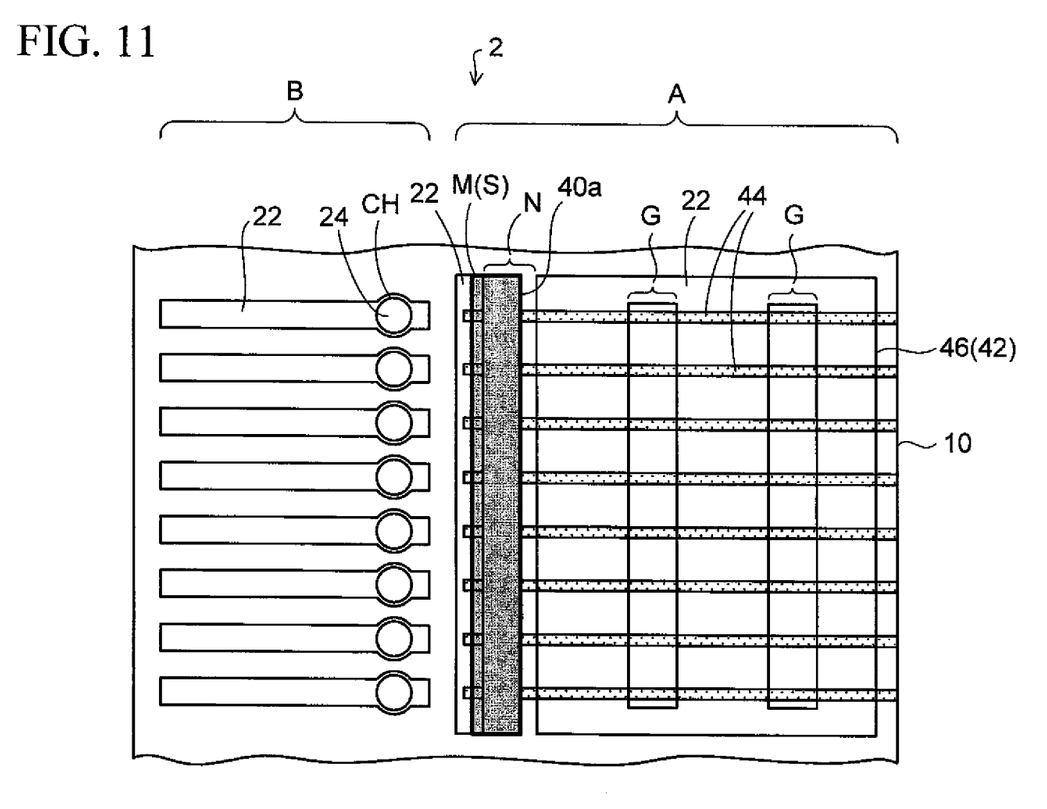
FIG. 11 is a plan view of the optical waveguide device in FIG. 10 as seen from above.

FIG. 11 is a plan view of FIG. 10 as seen from above, and each element is depicted transparently. Hereinafter, referring to the plan view in FIG. 11 in addition to FIG. 10, the plurality of core layers 44 shaped like the belt are arranged side by side on an upper face of the first cladding layer 42 in the optical waveguide formation region A.

Then, the groove portion 40a including the inclined face S is formed in the light path conversion portions of the one edge sides of the optical waveguides 40. The groove portion 40a is formed to divide the second cladding layer 46 and the core layers 44, and is formed to a halfway position of the thickness of the first cladding layer 42.

Alternatively, the groove portion 40a may be formed so as to divide the whole of the first cladding layer 42 in the thickness direction. As depicted in the plan view in FIG. 11, the groove portion 40a is arranged to be perpendicular to the extending direction of the core layers 44, and is formed like the belt so as to integrally divide all of the core layers 44.

Further, the light reflective metal layer is formed on the inclined face S of the groove portion 40a, thus the light path conversion mirror M is constituted.

In the region under the groove portion 40a, the non-formation region N in which the second wiring layer 22 does not exist is provided. Thus, the groove portion 40a is formed in a state that the groove portion 40a does not contact the second wiring layer 22.

As mentioned above, when the optical waveguides 40 are cut to form the groove portion 40a, it is devised such that the second wiring layer 22 is not exposed at the cutting faces of the groove portion 40a. For this reason, it is prevented that the second wiring layer 22 is deformed, thus the detachment is generated from the interface with the first cladding layer 42.

Moreover, in the inner region of the optical waveguide formation region A, the degassing opening portions G are formed in the second wiring layer 22. By this matter, as explained in FIG. 7B, even if a gas is generated from the core substrate 10 and the insulating layer 30 in a heating step of reflow-heating the solder, or the like, the gas can be discharged to the outside through the degassing opening portions G in the second wiring layer 22. The non-formation region N in the second wiring layer 22 also functions as a degassing path.

Moreover, in the optical waveguide device 2 of this embodiment, the structure is employed in which the first and second wiring layers 20 and 22 are not exposed at the cutting face on the other edge side of the optical waveguide device 2. In this way, the optical waveguide device 2 includes the cutting face at a side surface. And the side surface of the first wiring layer 20 is covered with the insulating layer 30, and the side surface of the second wiring layer 22 is covered with the first cladding layer 42.

In this way, since the first and second wiring layers 20 and 22 are not exposed when the end of the optical waveguide device 2 is cut, the problem is solved in which the first and second wiring layers 20 and 22 are deformed and detached.

Figure 12:
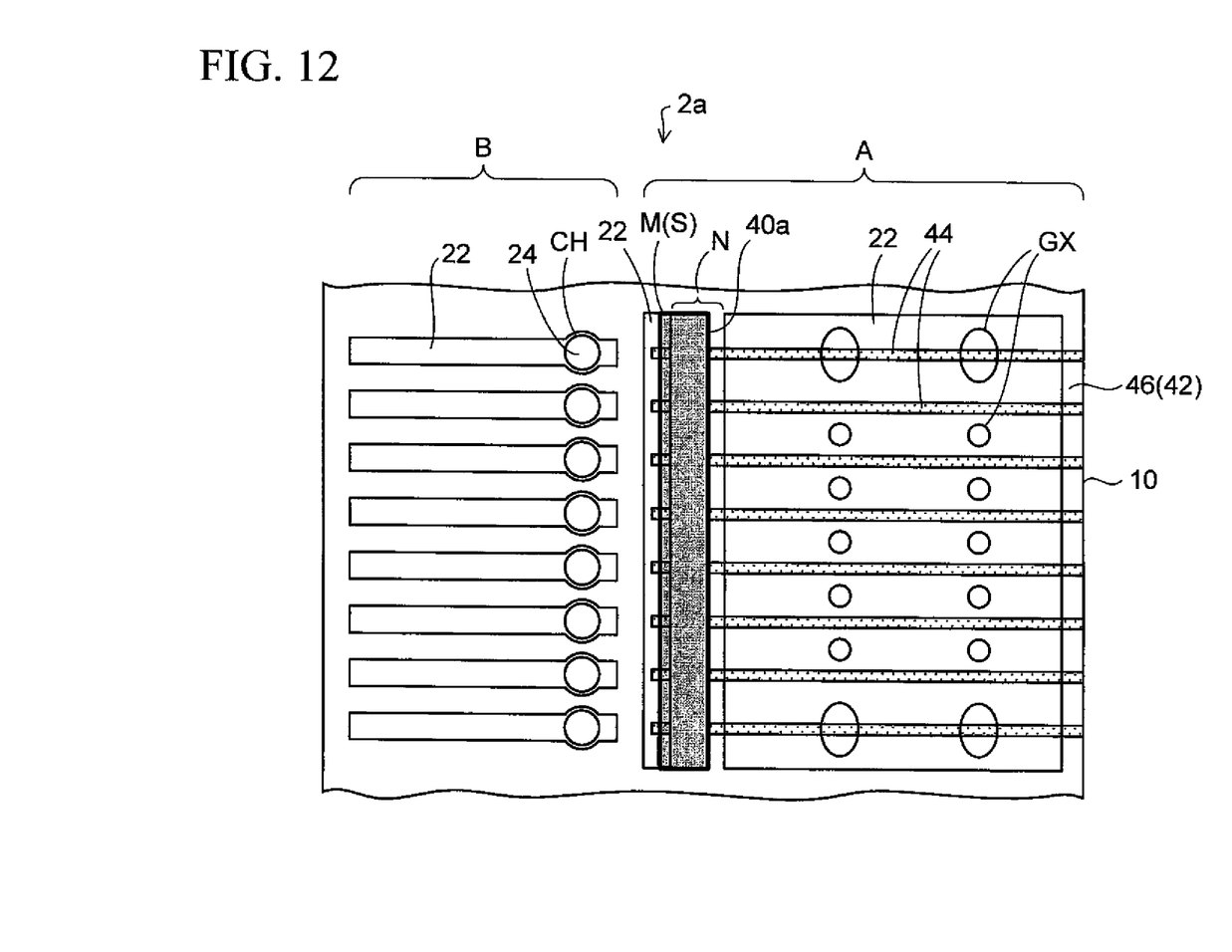
FIG. 12 is a plan view depicting an optical waveguide device of a modification of the embodiment.

FIG. 12 depicts an optical waveguide device 2a of a modification of this embodiment. In the optical waveguide device 2a of the modification, a plurality of degassing opening portions Gx having elliptical and circular shapes are formed side by side in the second wiring layer 22 in the optical waveguide formation region A. In this way, various shapes can be employed for the degassing opening portions formed in the second wiring layer 22.

In FIG. 12, the elements except the degassing opening portions Gx are the same as those in FIG. 11, and are therefore denoted by the same reference signs and explanation thereof is omitted.

In the examples of FIG. 11 and FIG. 12, the second wiring layer 22 in the optical waveguide formation region A has a structure in which a plurality of degassing opening portions are formed in the plane pattern which is integrally connected. However, the pattern of the second wiring layer 22 may be divided by the degassing opening portions.

Next, a method of connecting an optical element to the optical waveguide device 2 in FIG. 10 will be explained.

Figure 13:
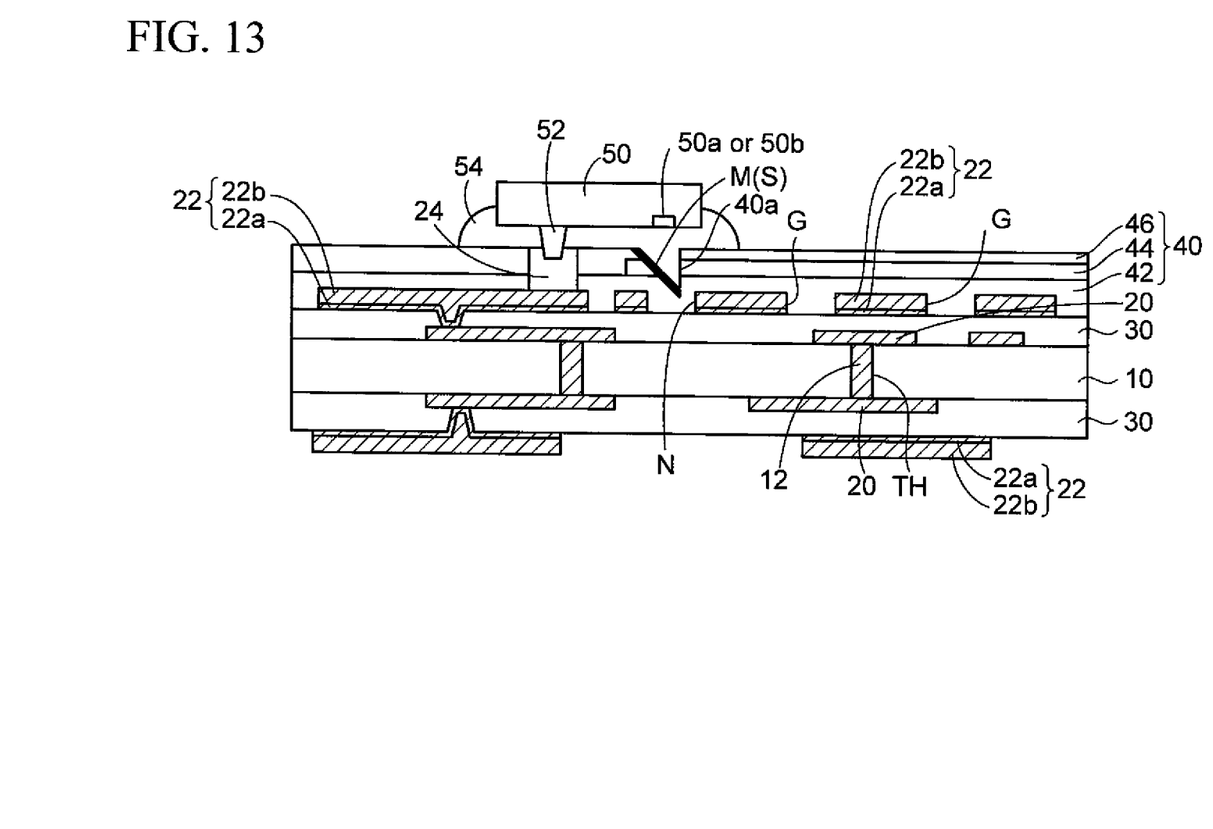
FIG. 13 is a cross-sectional view depicting a state in which an optical element is mounted on the optical waveguide device in FIG. 10.

As depicted in FIG. 13, an optical element 50 including connection terminals 52 on a lower face thereof is prepared. The connection terminals 52 are formed of bump electrodes which are gold bumps, or the like. Then, the connection terminals 52 of the optical element 50 are arranged on the solder electrodes 24 in the connection holes CH, and reflow heating is performed at a temperature of about 260° C. By this matter, the connection terminals 52 of the optical element 50 are inserted into the solder electrodes 24 and bonded to it.

In the case that the optical element 50 is a light emitting element, it includes light emitting portions 50a in a lower surface thereof, and the light emitting portions 50a are optically coupled to the light path conversion mirrors M of the optical waveguides 40. Alternatively, in the case that the optical element 50 is a light receiving element, it includes light receiving portions 50b, and the light receiving portions 50b are optically coupled to the light path conversion mirrors M of the optical waveguides 40.

Further, as depicted in FIG. 13 likewise, an underfill resin 54 is filled between the optical element 50 and the second cladding layer 46 of the optical waveguides 40 by a dispenser or the like.

By the above steps, the optical element 50 is mounted on the optical waveguide device 2 in FIG. 10, thus the structure is constituted as an optical device.

In the case that the optical element 50 is a light emitting element, electric signals outputted from a driver element (not depicted) are supplied to the light emitting element, and light is emitted downward from a light emitting face 50a of the light emitting element.

The light emitted from the light emitting element is transmitted through the underfill resin 54 and reaches the light path conversion mirrors M. Further, the light is reflected at the light path conversion mirrors M, thus the light path is converted by 90°, and then is entered into the core layers 44. Thereafter, the light entered into the core layers 44 propagates to the other edge side by repeating total reflection inside the core layers 44.

On the other hand, in the case that the optical element 50 is a light receiving element, the light propagates in the directions reverse to the light paths mentioned above, and the light is entered into the light receiving face 50b of the light receiving element. Further, the optical signals are converted into electric signals by the light receiving element, and the electric signals are supplied to an amplifier element (not depicted).

In the example of FIG. 13, a light connector for inputting and outputting the optical signals is mounted to the right edge part of the optical waveguides 40. Alternatively, a light receiving element or a light emitting element may be connected to the other edge side of the optical waveguides 40 so as to correspond to the optical element 50 (a light emitting element or a light receiving element) in FIG. 13.

In this case as well, similarly to the cutting face of the right edge part of the optical waveguide device 2 in FIG. 13, when the optical waveguides 40 and the wiring substrate 1 are cut, the first and second wiring layers 20 and 22 may be formed so as to be not exposed at the cutting face and to be covered with the insulating layer 30 and the first cladding layer 42, All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present invention have been described in detail, it should be understood that the various changes, substitutions, and alterations could be made hereto without departing from the spirit and scope of the invention.

Further, the clauses are disclosed about the above embodiment hereinafter.

(Clause 1) A method of manufacturing an optical waveguide device, comprising:

preparing a wiring substrate having a wiring layer, a non-formation region that the wiring layer is not formed, an optical waveguide formation region, and an opening portion formed in the wiring layer at the optical waveguide formation region;

forming an optical waveguide in the optical waveguide formation region on the wiring substrate so as to cover the wiring layer;

forming a groove portion in the optical waveguide in a region corresponding to the non-formation region in the wiring layer, the groove portion including an inclined face; and forming a light path conversion mirror on the inclined face of the groove portion.

(Clause 2) The method of manufacturing an optical waveguide device according to clause 1, after the forming of the light path conversion mirror, further comprising cutting the optical waveguide and the wiring substrate, wherein a side face of the wiring layer in a vicinity of cutting face of the optical waveguide and the wiring substrate is covered with the optical waveguide.

(Clause 3) The method of manufacturing an optical waveguide device according to clause 1, wherein the forming of the optical waveguide includes forming a first cladding layer, a core layer, and a second cladding layer in this order from below, and in the forming of the groove portion, the groove portion is formed from an upper face of the second cladding layer to a halfway position of a thickness of the first cladding layer.

(Clause 4) The method of manufacturing an optical waveguide device according to clause 1, after the forming of the light path conversion mirror, further comprising mounting an optical element to the wiring substrate, the optical element optically coupled to the light path conversion mirror.

What is claimed is:

1. An optical waveguide device, comprising:
a wiring substrate including an insulating layer and a wiring layer formed on the insulating layer;
an optical waveguide formed on the insulating layer and the wiring layer, the optical waveguide including a first cladding layer, a core layer, and a second cladding layer in this order from below, wherein the first cladding layer contacts an upper face and side faces of the wiring layer, and the wiring layer is buried in the first cladding layer;
a groove portion formed on an edge side of the optical waveguide, the groove portion including an inclined face;
a light path conversion mirror formed on the inclined face; and
an opening portion formed in the wiring layer under the optical waveguide,
wherein the wiring layer is not formed under the groove portion.

2. The optical waveguide device according to claim 1, wherein
the optical waveguide device includes a cutting face at a side surface, and
a side surface of the wiring layer in a vicinity of the cutting face is covered with the optical waveguide.

3. The optical waveguide device according to claim 1, wherein
the groove portion is formed from an upper face of the second cladding layer to a halfway position of a thickness of the first cladding layer.

4. The optical waveguide device according to claim 1, further comprising an optical element mounted on the wiring substrate, the optical element optically coupled to the light path conversion mirror.

* * * * *